No. 691,497. Patented Jan. 21, 1902.
JEAN GUIDO SIEGRIST, CALLED GUIDO SIGRISTE.
PHOTOGRAPHIC SHUTTER.
(Application filed July 18, 1899.)
(No Model.) 6 Sheets—Sheet 1.
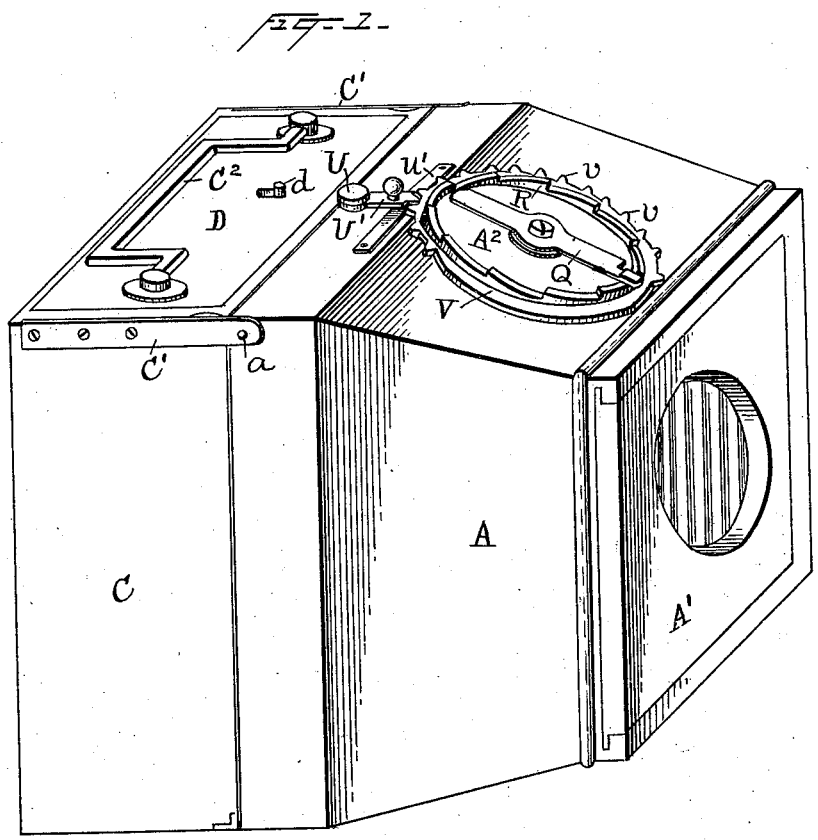

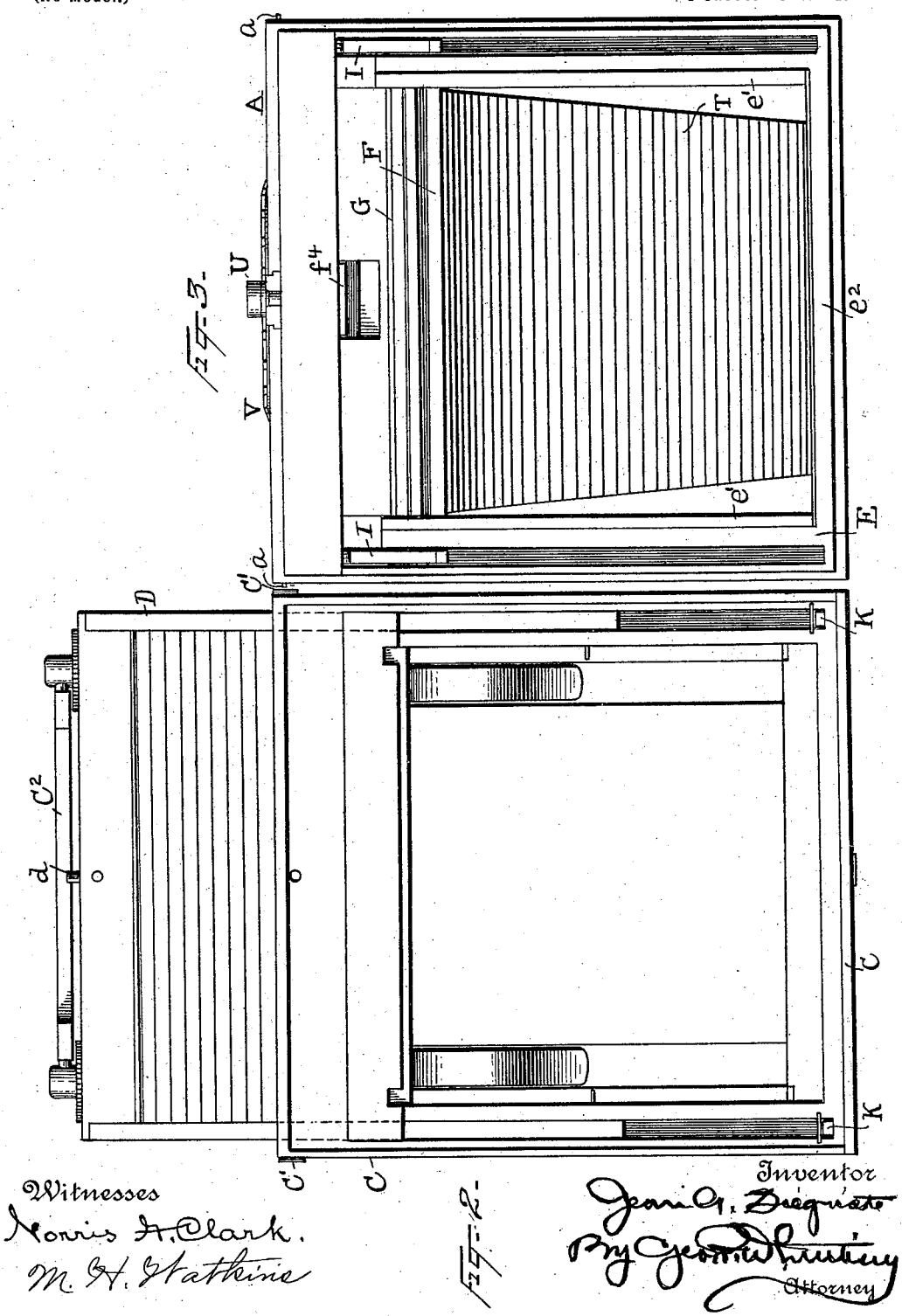

No. 691,497. Patented Jan. 21, 1902.
JEAN GUIDO SIEGRIST, CALLED GUIDO SIGRISTE.
PHOTOGRAPHIC SHUTTER.
(Application filed July 18, 1899.)
(No Model.) 6 Sheets—Sheet 3.
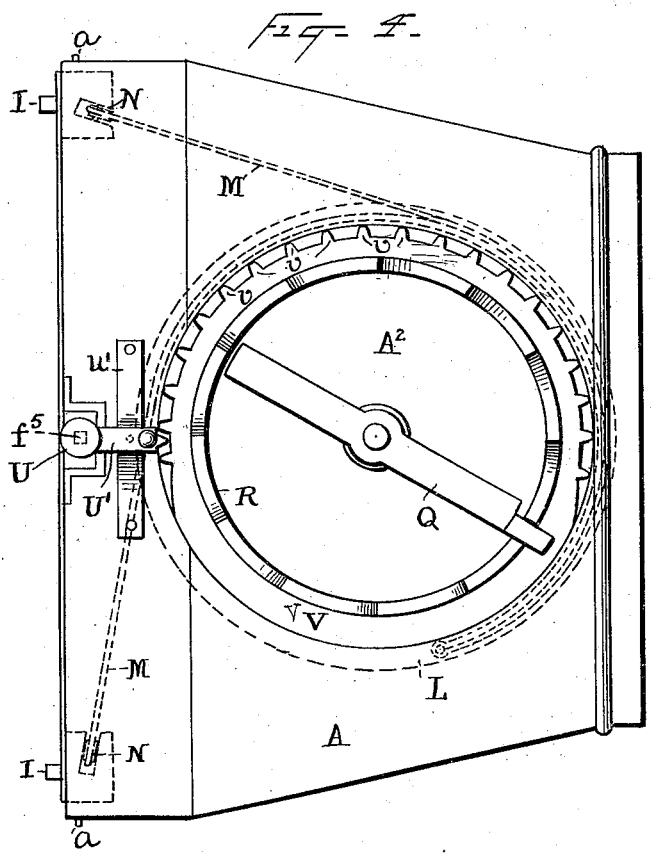

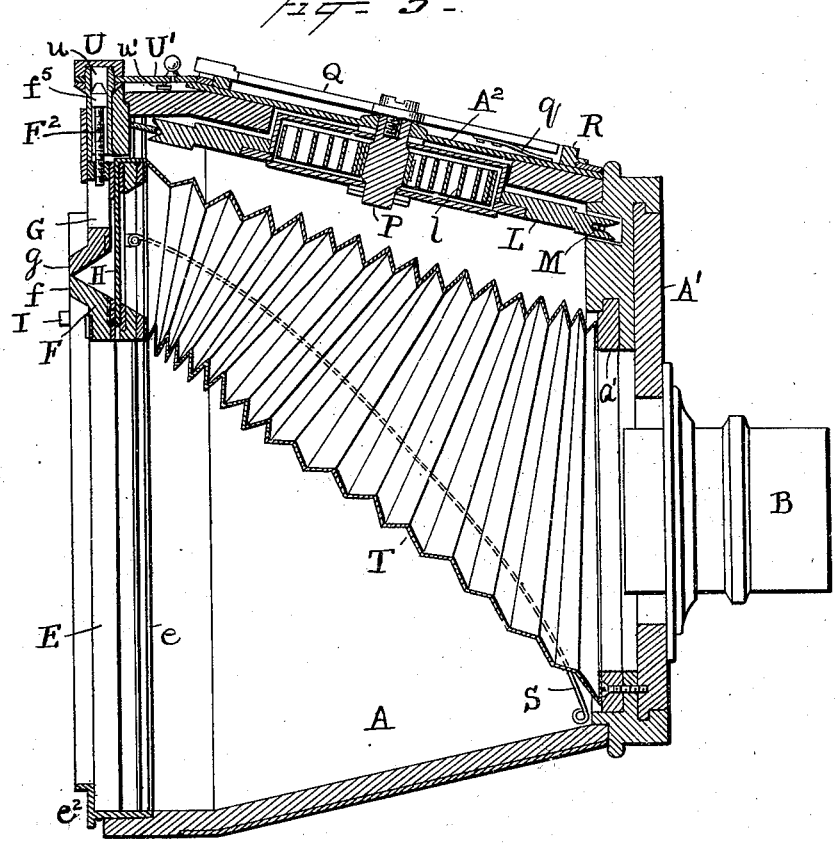

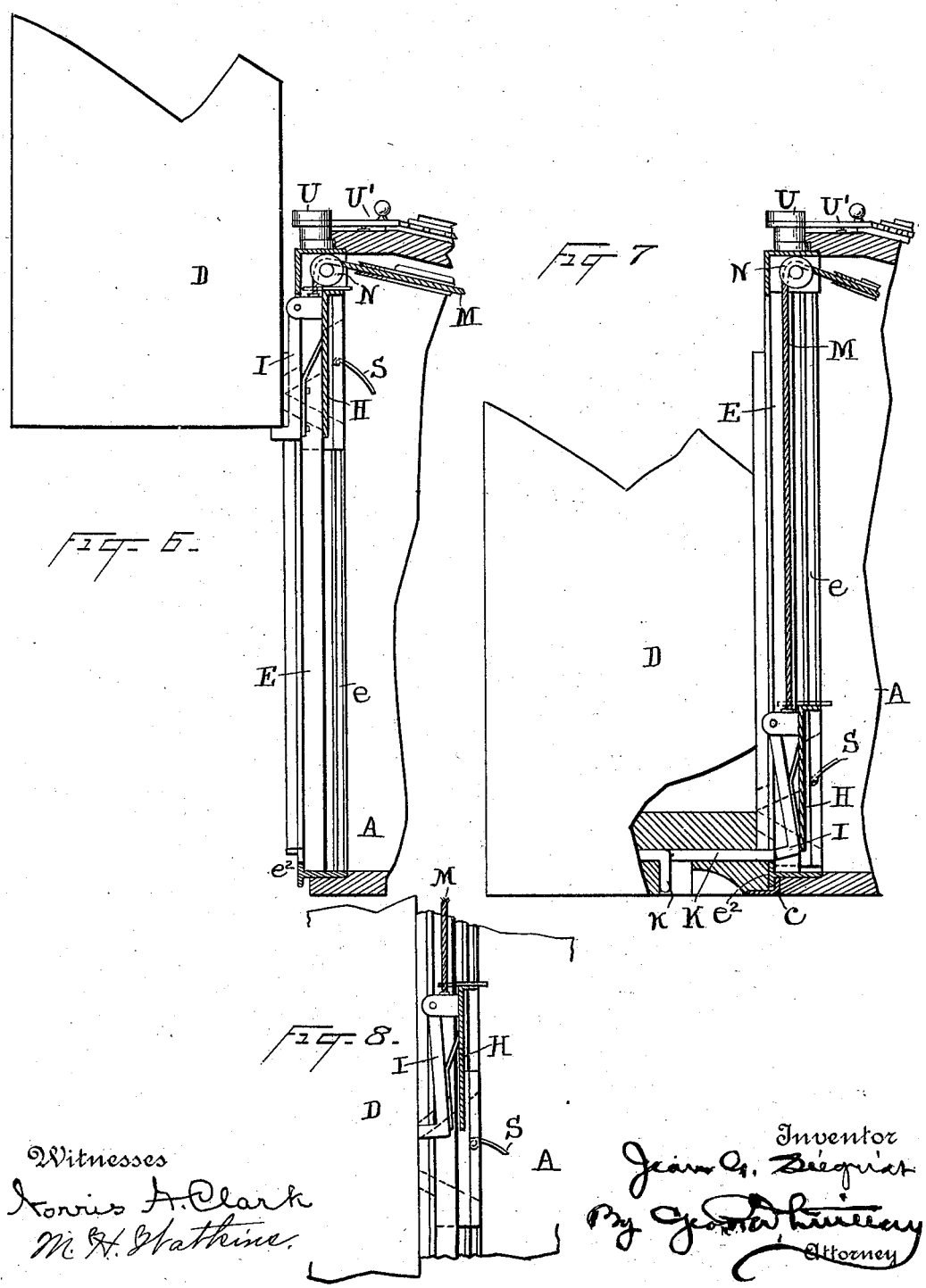

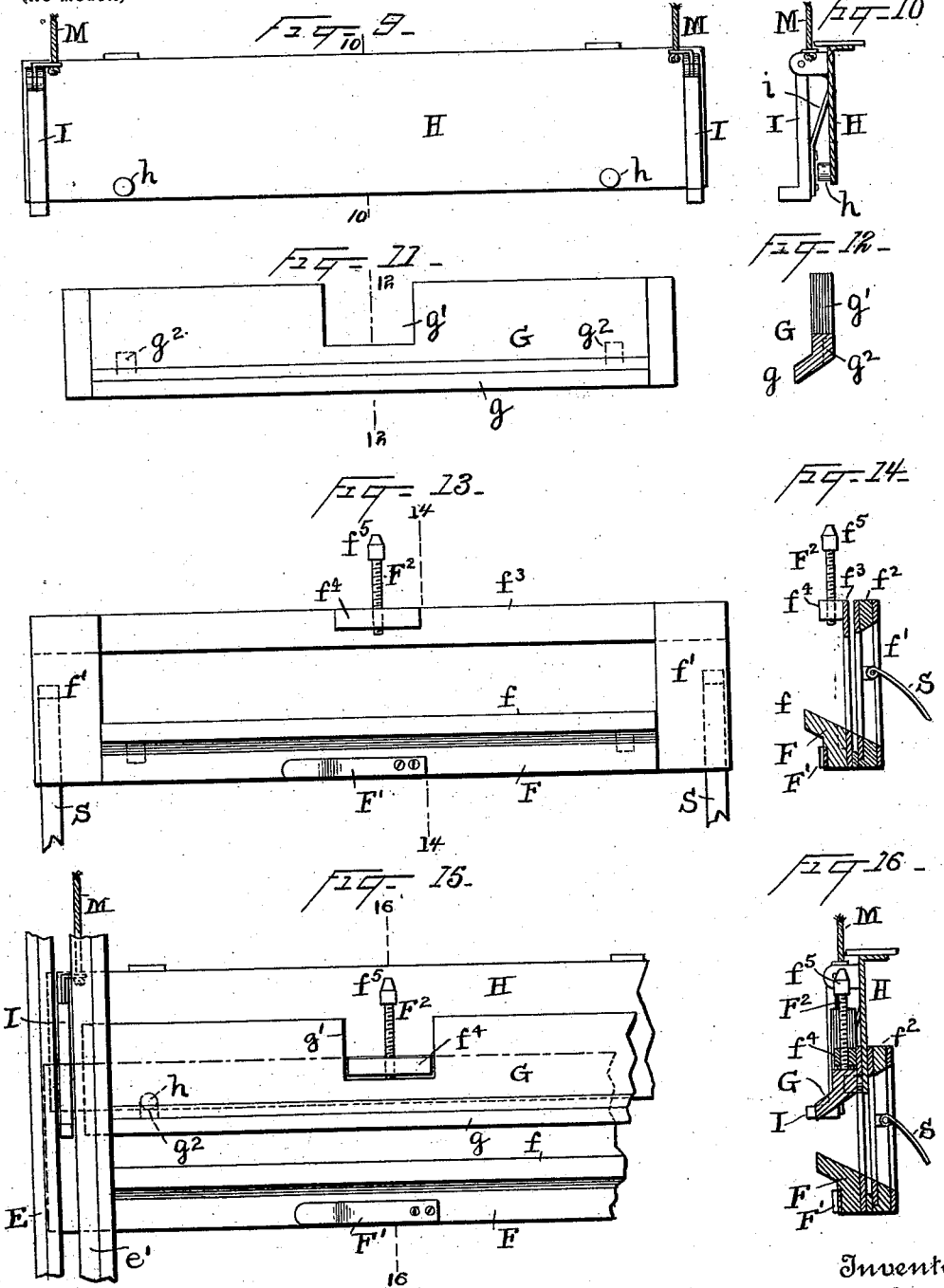

UNITED STATES PATENT OFFICE.

JEAN GUIDO SIEGRIST, (CALLED GUIDO SIGRISTE,) OF NEUILLY-SUR-SEINE, FRANCE.

PHOTOGRAPHIC SHUTTER.

SPECIFICATION forming part of Letters Patent No. 691,497, dated January 21, 1902.

Application filed July 18, 1899. Serial No. 724,284. (No model.)

*To all whom it may concern:*

Be it known that I, JEAN GUIDO SIEGRIST, (called GUIDO SIGRISTE,) a citizen of the Republic of Switzerland, residing at Neuilly-sur-Seine, in the department of Seine and Republic of France, have invented certain new and useful Improvements in Photographic Shutters; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to cameras; and its object is to improve the construction and operation of what are commonly known as "focal-plane-shutter" cameras.

The invention therefore consists in certain details of construction relating to the shutter and the mode of setting and operating it for exposures of various durations.

In the accompanying drawings, Figure 1 is a perspective view of my camera minus the lens-tube. Fig. 2 is a front view of the magazine-holder with the magazine raised. Fig. 3 is a rear view of the shutter and bellows-box. Fig. 4 is a top plan view of the bellows-box. Fig. 5 is a longitudinal vertical section of the bellows-box and shutter. Fig. 6 is a similar section of the rear portion of said box, showing the magazine raised and engaging with the shutter. Fig. 7 is a similar view showing the magazine moved down into place and the shutter set. Fig. 8 shows these parts when the shutter has been released and is moving upward. Fig. 9 is a rear view of the catch-carrying screen. Fig. 10 is a cross-section of the same on the line 10 10, Fig. 9. Fig. 11 is a rear elevation of the upper and movable jaw of the shutter. Fig. 12 is a cross-section of the same on the line 12 12, Fig. 11. Fig. 13 is a rear elevation of the lower jaw of the shutter. Fig. 14 is a cross-section of the same on the line 14 14, Fig. 13. Fig. 15 is a rear elevation of a portion of the assembled shutter. Fig. 16 is a cross-section of the same on the line 16 16, Fig. 15.

The camera comprises two main parts, to wit: the bellows-box A, which contains the shutter and its mechanism and also carries the lens-tube B, and the magazine-holder C, detachably fastened to the bellows-box and containing the magazine D, by whose movements the shutter is set. The shutter is normally held at the top of the bellows-box by springs, and when the magazine, having been drawn out of its holder to shift the plate, is again pushed down into place it carries the shutter with it against the tension of the springs, so that upon releasing the shutter it at once rises, opening as it starts and closing again as it stops on reaching the top of the bellows-box. The shape of the bellows-box is preferably that of a truncated four-sided pyramid placed with its base upright. The smaller end of the box is closed by a sliding plate A', on which is supported the lens-tube B. The larger rear end of the box is open and receives a metallic frame E, provided on each side with flanges $e$ and a bar $e'$, forming guides for the vertical movement of the shutter. Across the bottom of the frame extends a downwardly-depending flange or lip $e^2$. The magazine-holder has a forwardly and upwardly projecting lip $c$, which engages with the lip $e^2$, as shown in Fig. 7. At its upper end are two flat springs C', having holes to engage with pins $a$ on the box A and so hold the magazine and box securely together, as shown in Fig. 1.

The shutter comprises a lower or fixed jaw F and an upper movable jaw G, each having a projecting lip $f\,g$, which meet each other on a straight line transverse to the line of movement of the shutter, the ends of the jaws sliding in contact with the bars $e'$. The lower jaw forms part of a rectangular frame having upright end posts $f'$ beyond the ends of the jaw and upper cross-bars $f^2\;f^3$. A flat spring F' is fastened to the jaw F, and the cross-bar $f^3$ has a boss $f^4$, through which is tapped an adjusting-screw F$^2$. The upper jaw G is a flat plate adapted to rest against the end posts $f'$ of the lower jaw and having a notch $g'$ to permit it to rise past the boss $f^4$ until its edge comes in contact with the end of the screw F$^2$. By adjusting the screw the amount of separation of the jaws can be regulated. In the under side of the jaw G are two notches $g^2$, one near each end, adapted to be engaged by lugs $h$ on a screen H, which lies in front of the jaws F G between the cross-bars $f^2$ $f^3$. This screen is vertically movable, and whenever it is lifted the lugs catch under the jaw G and lift it too, as shown in Figs. 15 and 16. At each end of the screen is a pivoted hook I, maintained in a normal position by a spring $i$, as shown in Fig. 10. These hooks lie between the sides of the frame E and the upright bars $e'$, parallel therewith. The ends of the hooks project into the path of the magazine D, so that when it is inserted into its holder C its front edge strikes on the hooks and carries down the entire shutter, as shown in Fig. 6. When in place, the magazine is locked by a spring-catch $d$. In order to release the shutter, the holder C is provided with a push-rod K at each end, having a connecting-handle K, by which they can be simultaneously operated to crowd back the hooks, as shown in Fig. 7, and allow the shutter to rise, as shown in Fig. 8. The shutter is lifted, preferably, by means of a spring-drum L, mounted in the bellows-box, preferably in an opening in its top. Two cords are attached to the drum and run over pulleys N at the upper rear corners of the box to the ends of the screen H. The downward movement of the shutter exerts a pull on these cords, which rotates the drum and winds up the spring $l$. One end of the spring is fastened to the drum and the other to a central post P, rotatable in a plate $A^2$, which covers the opening in the box A and is secured to the box. The outer end of the post carries a lever Q, under one end of which is a spring $q$, which causes its other end to automatically engage the teeth in a notched circle R, secured to the plate $A^2$, concentric with the post. By moving the lever from one tooth to the next the tension of the spring $l$ is altered. When the shutter is released by the push-rods K, the flat spring F', being compressed by the front of the upwardly-extending portion of the flange $e^2$, retards the lower jaw from moving with the upper one, so that the first effect of the upward movement of the cords M is to lift only the screen until its lugs $h$ strike the upper jaw G. The continued movement of the screen opens the jaw G until it abuts against the screw $F^2$, when the retarding effect of the spring F' is overcome, and the entire shutter, now wide open, is lifted to the upper end of its stroke. In order to close the shutter at this point, the lower jaw is attached to one or more springs, such as the flat spring S, which lift it to its highest and closed position, as shown in Fig. 5, after the screen has reached its upward limit of movement. The operation described takes place very quickly, one step following another with great rapidity, so that if the spring $l$ is strong enough an exceedingly short exposure can be made. The flexible bellows is fastened at one end to the frame of the lower jaw and at the other end to the inside of the front end of the box A or to a frame $a'$, secured thereto, and swings up and down with the movements of the shutter. The bellows is made of non-actinic material, such as sheepskin split and covered with paper.

In order to indicate to the operator the width of the opening between the jaws, the adjusting-screw $F^2$ is provided with a polygonal head $f^5$, which when the shutter is up enters a polygonal socket $u$ in a hub U, rotatable in the frame E and provided outside of the box A with a lever-handle U', engaged by a detent-spring $u'$. The end of the lever engages with the teeth $v$ of an annular plate V, mounted to revolve freely on the top of the box A and preferably concentric with the annular toothed flange R. The number of teeth in the plate V is sufficient to give quite a fine graduation to the successive widths of opening between the jaws F G. The length of the exposure depends upon the tension of the spring $l$ and the width of the opening between the jaws, so that by varying the position of the lever Q and the toothed annulus V one can determine beforehand any desired time of exposure.

In operating this camera the plate to be exposed is held against the rear of the frame E by the mechanism of the magazine, which forms no part of the present invention. The shuttle lies with its lips $f g$ close to the plate and extending transversely its entire width. The screen H effectually prevents the light from passing between the lips $f g$. When the shutter is released and rises, as already explained, the plate is exposed across its whole width at once in a narrow belt which sweeps upward over it as the shutter flies up. The camera is then stood up on the back of the magazine-holder, and the magazine is drawn out by means of the handle $c^3$ as far as it will go, allowing the exposed plate to drop to the back and causing the magazine to engage with the hooks I, so that when it is pushed in again the shutter will be reset.

Having thus described my invention, what I claim, and desire to secure by Letters Patent, is—

1. In a camera, the combination with a bellows-box, of a bellows, a rectilineally-movable shutter attached to the rear end of said bellows, and means for automatically opening and closing said shutter when it is moved.

2. In a camera, a shutter movable parallel with the plate, and comprising two relatively movable jaws, and means for automatically opening and closing the same when the shutter moves.

3. In a camera, a shutter movable parallel with the plate, and comprising two relatively movable jaws, means for adjusting the amount of opening between them, and means for automatically opening and closing them when the shutter moves.

4. In a camera, a shutter movable parallel with the plate, and comprising two relatively movable jaws, a screen in front of said jaws, and means for automatically withdrawing the screen and opening the jaws when the shutter moves.

5. In a camera, a shutter movable parallel with the plate, and comprising a fixed jaw and a movable jaw, a movable screen adapted to engage with the movable jaw, and means for moving the screen.

6. In a camera, a shutter movable parallel with the plate, and comprising a fixed jaw and a movable jaw, a movable screen adapted to engage with the movable jaw, and means for moving the screen, and also moving the shutter.

7. In a camera, a shutter movable parallel with the plate, and comprising a fixed jaw and a movable jaw, a movable screen adapted to engage with and open the movable jaw, means for moving the screen and the shutter, and means for retarding the shutter until the jaws are open.

8. In a camera, a shutter movable parallel with the plate, and comprising a fixed jaw and a movable jaw, a movable screen adapted to engage with and open the movable jaw, means for moving the screen and the shutter, and means for retarding the shutter until the jaws are open, and means for closing the fixed jaw against the movable jaw when the shutter reaches the end of its movement.

9. In a camera, the combination with a movable shutter, comprising a fixed and a movable jaw, of a spring-drum, and cords attached to said drum and operating to open the movable jaw and move the shutter.

10. In a camera, the combination with a movable shutter, comprising a fixed jaw, a movable jaw and a movable screen engaging with the movable jaw, of a spring-drum, and cords connecting said drum with said screen.

11. In a camera, the combination with a movable shutter, comprising a fixed and a movable jaw, of a screw for adjusting the amount of opening of said jaws, and a rotatable socketed hub with which said screw engages when the shutter is at one end of its movement.

12. In a camera, the combination with a movable shutter, comprising a fixed and a movable jaw, of a screw for adjusting the amount of opening of said jaws, and a rotatable socketed hub with which said screw engages when the shutter is at one end of its movement, a handle on said hub, and an index adjacent to said handle.

13. In a camera, the combination with a movable shutter, comprising a fixed and a movable jaw, of a screw for adjusting the amount of opening of said jaws, and a rotatable socketed hub with which said screw engages when the shutter is at one end of its movement, a handle on said hub and a toothed annulus with which said handle engages at every revolution.

14. In a camera, the combination with a shutter movable in a focal plane, of a magazine movable in a direction parallel with said plane, and catches on the shutter located in the path of said magazine and adapted to be engaged thereby, whereby said shutter will be set by said magazine when the latter is moved into position for exposing a plate.

15. In a camera, the combination with a spring-actuated shutter movable in a focal plane, of a magazine movable in a direction parallel with said plane, spring-catches on the shutter lying in the path of said magazine and adapted to be engaged thereby, whereby said shutter will be set by said magazine when the latter is moved into position for exposing a plate, and means for disengaging said catches from the magazine in order to permit the spring to actuate said shutter.

16. In a camera, the combination with a movable shutter, comprising two relatively movable jaws, and a movable screen, of a spring-drum connected with said screen, spring-hooks pivoted on the screen, and a magazine adapted to engage with said hooks and set the shutter when moved into place.

In testimony whereof I affix my signature in presence of two witnesses.

JEAN GUIDO SIEGRIST,
(Called GUIDO SIGRISTE.)

Witnesses:
HENRY PLANTER,
EDWARD P. MACLEAN.